United States Patent
Pang et al.

(10) Patent No.: US 9,756,504 B2
(45) Date of Patent: Sep. 5, 2017

(54) SECURITY AUTHENTICATION METHOD, DEVICE, AND SYSTEM

(71) Applicant: Huawei Device Co., Ltd., Shenzhen (CN)

(72) Inventors: Gaokun Pang, Shenzhen (CN); Zhiming Ding, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 34 days.

(21) Appl. No.: 14/791,716

(22) Filed: Jul. 6, 2015

(65) Prior Publication Data
US 2015/0312763 A1    Oct. 29, 2015

Related U.S. Application Data

(63) Continuation of application No. PCT/CN2013/085118, filed on Oct. 12, 2013.

(30) Foreign Application Priority Data

Jan. 6, 2013    (CN) .......................... 2013 1 0003687

(51) Int. Cl.
*H04L 29/06* (2006.01)
*H04W 12/06* (2009.01)
(Continued)

(52) U.S. Cl.
CPC ............. *H04W 12/06* (2013.01); *H04L 63/08* (2013.01); *H04L 67/04* (2013.01); *H04L 63/061* (2013.01); *H04W 12/04* (2013.01)

(58) Field of Classification Search
CPC .............................. H04L 63/061; H04L 63/08
(Continued)

(56) References Cited

U.S. PATENT DOCUMENTS 6,341,349 B1 *   1/2002   Takaragi ............... H04L 9/3247
                                                          380/28
6,718,467 B1 *   4/2004   Trostle .................. H04L 9/0844
                                                          380/281
(Continued)

FOREIGN PATENT DOCUMENTS

CN         101082883 A        12/2007
CN         101256615 A         9/2008
(Continued)

OTHER PUBLICATIONS

He, "Dynamic Key management in wireless sensor networks: A survey", Mar. 2012, Journal of Network Computer Applications, p. 611-622.*

(Continued)

*Primary Examiner* — Taghi Arani
*Assistant Examiner* — Gregory Lane
(74) *Attorney, Agent, or Firm* — Conley Rose, P.C.

(57) ABSTRACT

A security authentication method, device, and system are provided. A first device and a second device perform security authentication by using a first mapping key and a second mapping key, where the first mapping key is generated according to an initial key of the first device and a first predetermined algorithm, the second mapping key is generated according to an initial key of the second device and the first predetermined algorithm. A device in embodiments of the present invention performs security authentication by using a mapped initial key, which can increase the difficulty for an attacker to acquire a key, thereby improving security of a wireless network connection.

21 Claims, 3 Drawing Sheets

300

First device

Second device

(51) Int. Cl.
*H04L 29/08* (2006.01)
*H04W 12/04* (2009.01)

(58) Field of Classification Search
USPC ............................................. 713/171
See application file for complete search history.

(56) References Cited

U.S. PATENT DOCUMENTS

| | | | | |
|---|---|---|---|---|
| 2003/0219129 A1* | 11/2003 | Whelan | ............... | H04L 9/0891 380/270 |
| 2003/0233550 A1* | 12/2003 | Brickell | ............... | G06F 21/85 713/171 |
| 2005/0235148 A1* | 10/2005 | Scheidt | ............... | G06F 21/31 713/168 |
| 2005/0283826 A1* | 12/2005 | Tahan | ............... | G06F 21/606 726/2 |
| 2007/0079362 A1* | 4/2007 | Lortz | ............... | H04L 63/0807 726/5 |
| 2008/0120506 A1* | 5/2008 | Yamauchi | ........... | H04L 63/0442 713/176 |
| 2011/0271334 A1* | 11/2011 | Yang | ............... | H04L 63/083 726/7 |
| 2011/0314286 A1 | 12/2011 | Tie et al. | | |
| 2013/0110920 A1* | 5/2013 | Broustis | ............... | H04L 63/04 709/204 |

FOREIGN PATENT DOCUMENTS

| | | |
|---|---|---|
| CN | 101989984 A | 3/2011 |
| CN | 102026188 A | 4/2011 |
| CN | 102231883 A | 11/2011 |
| CN | 102685741 A | 9/2012 |

OTHER PUBLICATIONS

Foreign Communication From a Counterpart Application, PCT Application No. PCT/CN2013/085118, English Translation of International Search Report dated Jan. 23, 2014, 2 pages.
Foreign Communication From a Counterpart Application, PCT Application No. PCT/CN2013/085118, English Translation of Written Opinion dated Jan. 23, 2014, 6 pages.
Foreign Communication From a Counterpart Application, Chinese Application No. 201310003687.X, Chinese Search Report dated Sep. 23, 2016, 2 pages.
Foreign Communication From a Counterpart Application, Chinese Application No. 201310003687.X, Chinese Office Action dated Oct. 9, 2016, 3 pages.

\* cited by examiner

SECURITY AUTHENTICATION METHOD, DEVICE, AND SYSTEM

CROSS-REFERENCE TO RELATED APPLICATIONS

This application is a continuation of International Application No. PCT/CN2013/085118, filed on Oct. 12, 2013, which claims priority to Chinese Patent Application No. 201310003687.X, filed on Jan. 6, 2013, both of which are hereby incorporated by reference in their entireties.

TECHNICAL FIELD

The present invention relates to the field of communications technologies, and to a security authentication method, device, and system.

BACKGROUND

Main operations for security establishment of an existing network, especially security Wireless Fidelity (WiFi) protected setup (WPS) include: 1. establishing an initial wireless network; 2. adding a new device to the wireless network. An architecture of the WPS has three components: an application terminal (which is referred to as enrollee in the WPS), an authentication device (registrar), and an access point (AP), where the AP is an infrastructure of a wireless local area network, that is, an AP that supports the 802.11 protocol; the authentication device is a device for managing establishment of a network, and adding/deleting an application terminal, and the authentication device may be integrated with the AP, and may also be implemented by an external device, such as a mobile phone and a computer.

In the prior art, after a discovery process executed by the application terminal and the authentication device is completed, the authentication device performs key exchange negotiation with the application terminal after acquiring a key of the application terminal, for example, the terminal or the authentication device uses a personal identifier number (PIN) as a key and sends, after key translation, the translated key to the opposite party to perform verification.

The inventors of the present invention find that, in key negotiation in the prior art, a half of a PIN is directly used to perform authentication; when an attacker disguises himself as the foregoing application terminal or the authentication device, after obtaining a key message, the attacker can easily obtain a key by using a brute force attack. It is assumed that a quantity of digits (decimal notation) of the key is N; an amount of calculation is $10^{(N/2)}$ times, instead of $10^N$ times, that is, a maximum amount of calculation. As a result, calculation times are reduced, which affects security or reliability of a wireless network connection.

SUMMARY

Embodiments of the present invention provide a security authentication method, device, and system, which can increase the difficulty for an attacker to acquire a key, increase times of calculation for obtaining a key by using a brute force attack, and have a dynamic effect to some extent, thereby improving security of a wireless network connection.

According to a first aspect, a security authentication method is provided, where the method includes sending, by a first device, a message 1 to a second device, where the message 1 includes first key information, so that the second device executes, after receiving the message 1, a dynamic key exchange algorithm according to the first key information, to generate at least one encryption key; receiving, by the first device, a message 2 returned by the second device to the first device, where the message 2 includes second key information; and executing, by the first device, a dynamic key exchange algorithm according to the second key information, to generate at least one encryption key; sending, by the first device, a message 3 to the second device, where the message 3 includes a hash value 1 of the first device and a hash value 2 of the first device, where the hash value 1 of the first device is generated according to a random number 1 of the first device and a first part of a first mapping key, and the hash value 2 of the first device is generated according to a random number 2 of the first device and a second part of the first mapping key, so that the second device determines, after receiving the message 3, to return a message 4 to the first device, where the first mapping key is generated according to an initial key of the first device and a first predetermined algorithm; receiving, by the first device, the message 4 sent by the second device, where the message 4 includes a hash value 1 of the second device, a hash value 2 of the second device, and an encrypted random number 1 of the second device, where the hash value 1 of the second device is generated according to the random number 1 of the second device and a first part of a second mapping key, the hash value 2 of the second device is generated according to a random number 2 of the second device and a second part of the second mapping key, the encrypted random number 1 of the second device is obtained by encrypting a random number 1 of the second device by using the encryption key, and the second mapping key is generated according to an initial key of the second device and the first predetermined algorithm, so that the first device performs authentication on the hash value 1 of the second device according to the random number 1 of the second device and the first mapping key, and if the hash value 1 of the second device is correct, determines to return a message 5 to the second device; sending, by the first device, the message 5 to the second device, where the message 5 includes the random number 1 that is of the first device and is obtained after encryption by using the encryption key, so that the second device performs authentication on the hash value 1 of the first device according to the random number 1 of the first device and the second mapping key, and if the hash value 1 of the first device is correct, determines to return a message 6 to the first device; receiving, by the first device, the message 6, where the message 6 includes the random number 2 that is of the second device and is obtained after encryption by using the encryption key, so that the first device performs authentication on the hash value 2 of the second device according to the random number 2 of the second device and the first mapping key, and if the hash value 2 of the second device is correct, which indicates that the authentication performed by the first device on the second device succeeds, determines to return a message 7 to the second device; and sending, by the first device, the message 7 to the second device, where the message 7 includes the random number 2 that is of the first device and is obtained after encryption by using the encryption key, so that the second device performs authentication on the hash value 2 of the first device according to the random number 2 of the first device and the second mapping key, where if the hash value 2 of the first device is correct, it indicates that the authentication performed by the second device on the first device succeeds.

In a first possible implementation manner of the first aspect, the dynamic key exchange algorithm is at least one of a Diffe-Hellman (DH) algorithm, a Ron Rivest, Adi Shamirh, and Len Adleman (RSA) algorithm, and an EIGamal algorithm.

With reference to the first aspect or any one of the foregoing possible implementation manners, in a second possible implementation manner, that the first device performs authentication on the hash value 1 of the second device according to the random number 1 of the second device and the first mapping key includes reconstructing, by the first device, a hash value 3 of the second device according to the random number 1 of the second device and the first mapping key, comparing the hash value 3 of the second device with the hash value 1 that is of the second device and is in the message 4, and if the hash value 3 of the second device is the same as the hash value 1 that is of the second device and is in the message 4, determining to return the message 5 to the second device.

With reference to the first aspect or either of the foregoing possible implementation manners, in a third possible implementation manner, that the first device performs authentication on the hash value 2 of the second device according to the random number 2 of the second device and the first mapping key includes reconstructing, by the first device, a hash value 4 of the second device according to the random number 2 of the second device and the first mapping key, comparing the hash value 4 of the second device with the hash value 2 that is of the second device and is in the message 4, and if the hash value 4 of the second device is the same as the hash value 2 that is of the second device and is in the message 4, determining to return the message 7 to the second device.

With reference to the first aspect or any one of the foregoing possible implementation manners, in a fourth possible implementation manner, before the step of sending, by a first device, a message 1 to a second device, further including generating and storing, by the first device, a mapping key list, so that the first device selects the first mapping key from the mapping key list according to a predetermined rule.

With reference to the first aspect or any one of the foregoing possible implementation manners, in a fifth possible implementation manner, the first device and the second device are transposed, so that the second device performs a step of the first device, and the first device performs a step of the second device.

According to a second aspect, a security authentication system is provided, where the system is applied to a first device and a second device, and the first device sends a message 1 to the second device, where the message 1 includes first key information, so that the second device executes, after receiving the message 1, a dynamic key exchange algorithm according to the first key information, to generate at least one encryption key; the first device receives a message 2 returned by the second device to the first device, where the message 2 includes second key information, and the first device executes a dynamic key exchange algorithm according to the second key information, to generate at least one encryption key; the first device sends a message 3 to the second device, where the message 3 includes a hash value 1 of the first device and a hash value 2 of the first device, where the hash value 1 of the first device is generated according to a random number 1 of the first device and a first part of a first mapping key, and the hash value 2 of the first device is generated according to a random number 2 of the first device and a second part of the first mapping key, so that the second device determines, after receiving the message 3, to return a message 4 to the first device, where the first mapping key is generated according to an initial key of the first device and a first predetermined algorithm; the first device receives the message 4 sent by the second device, where the message 4 includes a hash value 1 of the second device, a hash value 2 of the second device, and an encrypted random number 1 of the second device, where the hash value 1 of the second device is generated according to the random number 1 of the second device and a first part of a second mapping key, the hash value 2 of the second device is generated according to a random number 2 of the second device and a second part of the second mapping key, the encrypted random number 1 of the second device is obtained by encrypting a random number 1 of the second device by using the encryption key, and the second mapping key is generated according to an initial key of the second device and the first predetermined algorithm, so that the first device performs authentication on the hash value 1 of the second device according to the random number 1 of the second device and the first mapping key, and if the hash value 1 of the second device is correct, determines to return a message 5 to the second device; the first device sends the message 5 to the second device, where the message 5 includes the random number 1 that is of the first device and is obtained after encryption by using the encryption key, so that the second device performs authentication on the hash value 1 of the first device according to the random number 1 of the first device and the second mapping key, and if the hash value 1 of the first device is correct, determines to return a message 6 to the first device; the first device receives the message 6, where the message 6 includes the random number 2 that is of the second device and is obtained after encryption by using the encryption key, so that the first device performs authentication on the hash value 2 of the second device according to the random number 2 of the second device and the first mapping key, and if the hash value 2 of the second device is correct, which indicates that the authentication performed by the first device on the second device succeeds, determines to return a message 7 to the second device; and the first device sends the message 7 to the second device, where the message 7 includes the random number 2 that is of the first device and is obtained after encryption by using the encryption key, so that the second device performs authentication on the hash value 2 of the first device according to the random number 2 of the first device and the second mapping key, where if the hash value 2 of the first device is correct, it indicates that the authentication performed by the second device on the first device succeeds.

In a first possible implementation manner of the second aspect, the dynamic key exchange algorithm is at least one of a DH algorithm, an RSA algorithm, and an EIGamal algorithm.

With reference to the second aspect or any one of the foregoing possible implementation manners of the second aspect, in a second possible implementation manner, that the first device performs authentication on the hash value 1 of the second device according to the random number 1 of the second device and the first mapping key includes reconstructing, by the first device, a hash value 3 of the second device according to the random number 1 of the second device and the first mapping key, comparing the hash value 3 of the second device with the hash value 1 that is of the second device and is in the message 4, and if the hash value 3 of the second device is the same as the hash value 1 that is of the second device and is in the message 4, determining to return the message 5 to the second device.

With reference to the second aspect or either of the foregoing possible implementation manners, in a third possible implementation manner, that the first device performs authentication on the hash value 2 of the second device according to the random number 2 of the second device and the first mapping key includes reconstructing, by the first device, a hash value 4 of the second device according to the random number 2 of the second device and the first mapping key, comparing the hash value 4 of the second device with the hash value 2 that is of the second device and is in the message 4, and if the hash value 4 of the second device is the same as the hash value 2 that is of the second device and is in the message 4, determining to return the message 7 to the second device.

With reference to the second aspect or any one of the foregoing possible implementation manners, in a fourth possible implementation manner, wherein before the step of sending, by the first device, a message 1 to the second device, the first device generates and stores a mapping key list, so that the first device selects the first mapping key from the mapping key list according to a predetermined rule.

With reference to the second aspect or any one of the foregoing possible implementation manners, in a fifth possible implementation manner, the first device and the second device are transposed, so that the second device performs a step of the first device, and the first device performs a step of the second device.

According to a third aspect, a first device for security authentication is provided, which is configured to perform security authentication on a second device, where the first device includes a communication module, an authenticating module, a key generating module, and a control module, where the communication module sends a message 1 to the second device, where the message 1 includes first key information, so that the second device executes, after receiving the message 1, a dynamic key exchange algorithm according to the first key information, to generate at least one encryption key; the communication module receives a message 2 returned by the second device to the first device, where the message 2 includes second key information, and the key generating module executes a dynamic key exchange algorithm according to the second key information, to generate at least one encryption key; the communication module sends a message 3 to the second device, where the message 3 includes a hash value 1 of the first device and a hash value 2 of the first device, where the hash value 1 of the first device is generated according to a random number 1 of the first device and a first part of a first mapping key, and the hash value 2 of the first device is generated according to a random number 2 of the first device and a second part of the first mapping key, so that the second device determines, after receiving the message 3, to return a message 4 to the first device, where the first mapping key is generated by the key generating module according to an initial key of the first device and a first predetermined algorithm; the communication module receives the message 4 sent by the second device, where the message 4 includes a hash value 1 of the second device, a hash value 2 of the second device, and an encrypted random number 1 of the second device, where the hash value 1 of the second device is generated according to the random number 1 of the second device and a first part of a second mapping key, the hash value 2 of the second device is generated according to a random number 2 of the second device and a second part of the second mapping key, the encrypted random number 1 of the second device is obtained by encrypting a random number 1 of the second device by using the encryption key, and the second mapping key is generated according to an initial key of the second device and the first predetermined algorithm, so that the authenticating module performs authentication on the hash value 1 of the second device according to the random number 1 of the second device and the first mapping key, where if the hash value 1 of the second device is correct, the control module determines to return a message 5 to the second device; the communication module sends the message 5 to the second device, where the message 5 includes the random number 1 that is of the first device and is obtained after encryption by using the encryption key, so that the second device performs authentication on the hash value 1 of the first device according to the random number 1 of the first device and the second mapping key, and if the hash value 1 of the first device is correct, determines to return a message 6 to the first device; the communication module receives the message 6, where the message 6 includes the random number 2 that is of the second device and is obtained after encryption by using the encryption key, so that the authenticating module performs authentication on the hash value 2 of the second device according to the random number 2 of the second device and the first mapping key, where if the hash value 2 of the second device is correct, which indicates that the authentication performed by the first device on the second device succeeds, the control module determines to return a message 7 to the second device; and the communication module sends the message 7 to the second device, where the message 7 includes the random number 2 that is of the first device and is obtained after encryption by using the encryption key, so that the second device performs authentication on the hash value 2 of the first device according to the random number 2 of the first device and the second mapping key, where if the hash value 2 of the first device is correct, it indicates that the authentication performed by the second device on the first device succeeds.

In a first possible implementation manner of the third aspect, the dynamic key exchange algorithm is at least one of a DH algorithm, an RSA algorithm, and an ElGamal algorithm.

With reference to the third aspect or any one of the foregoing possible implementation manners, in a second possible implementation manner, that the authenticating module performs authentication on the hash value 1 of the second device according to the random number 1 of the second device and the first mapping key includes reconstructing, by the authenticating module, a hash value 3 of the second device according to the random number 1 of the second device and the first mapping key, and comparing the hash value 3 of the second device with the hash value 1 that is of the second device and is in the message 4, where if the hash value 3 of the second device is the same as the hash value 1 that is of the second device and is in the message 4, the control module determines to return the message 5 to the second device.

With reference to the third aspect or either of the foregoing possible implementation manners, in a third possible implementation manner, that the authenticating module performs authentication on the hash value 2 of the second device according to the random number 2 of the second device and the first mapping key includes reconstructing, by the authenticating module, a hash value 4 of the second device according to the random number 2 of the second device and the first mapping key, and comparing the hash value 4 of the second device with the hash value 2 that is of the second device and is in the message 4, where if the hash value 4 of the second device is the same as the hash value 2 that is of the second device and is in the message 4, the control module determines to return the message 7 to the second device.

With reference to the third aspect or any one of the foregoing possible implementation manners, in a fourth possible implementation manner, before the communication module sends the message 1 to the second device, the key generating module generates and stores a mapping key list, so that the first device selects the first mapping key from the mapping key list according to a predetermined rule.

With reference to the third aspect or any one of the foregoing possible implementation manners, in a fifth possible implementation manner, the first device and the second device are transposed, so that the second device has the communication module, the authenticating module, the key generating module, and the control module, and has a function of the first device.

According to the security authentication method, device, and system provided in the embodiments of the present invention, a device performs security authentication on another device by using a mapped initial key, which can increase the difficulty for an attacker to acquire a key, thereby improving security of a wireless network connection.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person skilled in the art may still derive other drawings from these accompanying drawings without creative efforts.

DETAILED DESCRIPTION

Embodiments of the present invention provide a network communication security authentication method, which can improve the difficulty for an attacker to acquire a key, thereby improving security of a wireless network connection. Details are separately described in the following.

The following clearly describes the technical solutions in the embodiments of the present invention with reference to the accompanying drawings in the embodiments of the present invention. The described embodiments are merely some but not all of the embodiments of the present invention. All other embodiments obtained by a person skilled in the art based on the embodiments of the present invention without creative efforts shall fall within the protection scope of the present invention.

Figure 1:
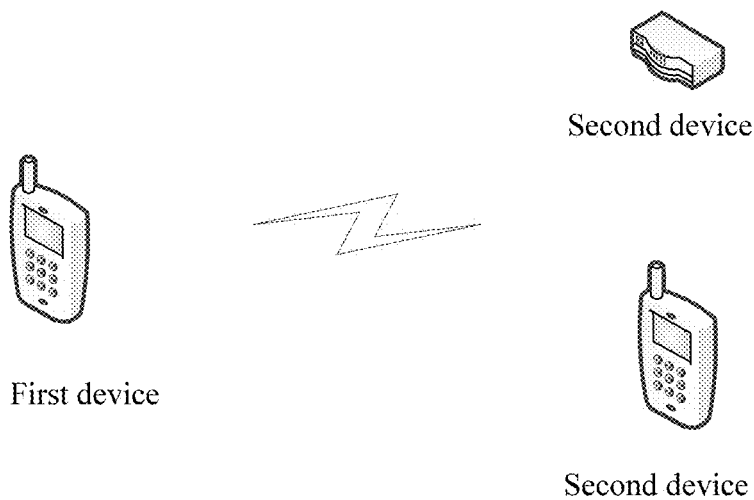
FIG. 1 is a diagram of an application scenario of security authentication according to an embodiment of the present invention.

A security authentication method of the embodiments of the present invention is applied to communication authentication between a first device and a second device that are in a network 300, FIG. 1 is a diagram of an application scenario of security authentication according to an embodiment of the present invention.

In this application, security authentication is performed between the first device and the second device, where the first device and the second device may be devices that have a same communication function. For example, the first device may be an AP, a router, a modem, a register, and the like; the second device may be a terminal device, or may be integrated into an electronic device that has a communication function, such as a mobile phone, a computer, and a PAD. It may be understood that, the first device and the second device may also be transposed. In the embodiments of the present invention, the first device may have a function of the second device, and the second device may also have a function of the first device.

It should be noted that, in the embodiments of the present invention, the first device and the second device may perform communication directly. For example, the first device and the second device may perform communication in a short-distance wireless manner. The communication in the short-distance wireless manner may be communication performed in a Near field Communication (NFC) manner, and may also be communication performed in a WiFi manner, or a Bluetooth® manner, or the like. The first device and the second device may further communicate with another device by using an AP of a network in which the first device or the second device is located, thereby performing security authentication.

Figure 2:
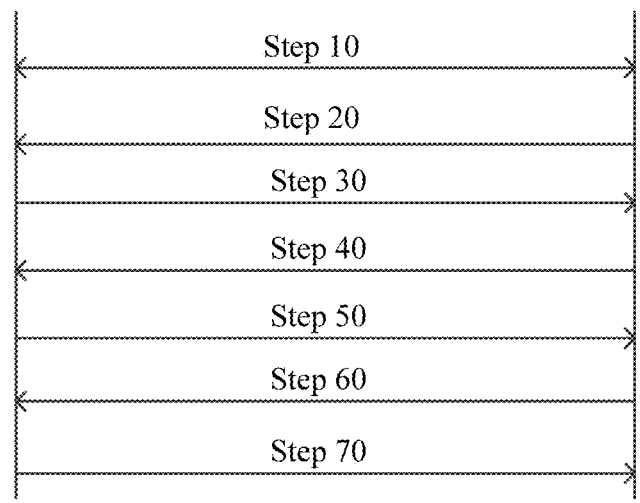
FIG. 2 is a schematic diagram of a security authentication method according to a first embodiment of the present invention.

Refer to FIG. 2, which is a schematic diagram of a security authentication method according to a first embodiment of the present invention.

The security authentication method includes the following steps.

10. A first device sends a message 1 to a second device, where the message 1 includes first key information, so that the second device executes, after receiving the message 1, a dynamic key exchange algorithm according to the first key information, to generate at least one encryption key.

20. The first device receives a message 2 returned by the second device to the first device, where the message 2 includes second key information, and the first device executes a dynamic key exchange algorithm according to the second key information, to generate at least one encryption key.

The dynamic key exchange algorithm in step 10 and step 20 is at least one of a DH algorithm, an RSA algorithm, and an ElGamal algorithm, where DH is an acronym of a Diffie-Hellman algorithm, RSA is an acronym of Ron Rivest, Adi Shamirh, and Len Adleman, and the ElGamal algorithm is an ElGamal key exchange algorithm. An encryption key, such as a DH key, key-derivation key (KDK), authentication key (AuthKey), KeyWrapKey, and extended master session key (EMSK), may be obtained by calculation by using a DH key exchange algorithm.

It may be understood that, each time security authentication is performed between the first device and the second device, the first key information and the second key information may change, and may be shared by the first device and the second device.

30. The first device sends a message 3 to the second device, where the message 3 includes a hash value 1 of the first device and a hash value 2 of the first device, where the hash value 1 of the first device is generated according to a random number 1 of the first device and a first part of a first mapping key, and the hash value 2 of the first device is generated according to a random number 2 of the first device and a second part of the first mapping key, so that the second device determines, after receiving the message 3, to return a message 4 to the first device, where the first mapping key is generated according to an initial key of the first device and a first predetermined algorithm.

40. The first device receives the message 4 sent by the second device, where the message 4 includes a hash value 1 of the second device, a hash value 2 of the second device, and an encrypted random number 1 of the second device, where the hash value 1 of the second device is generated according to the random number 1 of the second device and a first part of a second mapping key, the hash value 2 of the second device is generated according to a random number 2 of the second device and a second part of the second mapping key, the encrypted random number 1 of the second device is obtained by encrypting a random number 1 of the second device by using the encryption key, and the second mapping key is generated according to an initial key of the second device and the first predetermined algorithm, so that the first device performs authentication on the hash value 1 of the second device according to the random number 1 of the second device and the first mapping key, and if the hash value 1 of the second device is correct, determines to return a message 5 to the second device.

That the first device performs authentication on the hash value 1 of the second device according to the random number 1 of the second device and the first mapping key includes reconstructing, by the first device, a hash value 3 of the second device according to the random number 1 of the second device and the first mapping key, comparing the hash value 3 of the second device with the hash value 1 that is of the second device and is in the message 4, and if the hash value 3 of the second device is the same as the hash value 1 that is of the second device and is in the message 4, determining to return the message 5 to the second device.

50. The first device sends the message 5 to the second device, where the message 5 includes the random number 1 that is of the first device and is obtained after encryption by using the encryption key, so that the second device performs authentication on the hash value 1 of the first device according to the random number 1 of the first device and the first mapping key, and if the hash value 1 of the first device is correct, determines to return a message 6 to the first device.

60. The first device receives the message 6, where the message 6 includes the random number 2 that is of the second device and is obtained after encryption by using the encryption key, so that the first device performs authentication on the hash value 2 of the second device according to the random number 2 of the second device and the first mapping key, and if the hash value 2 of the second device is correct, which indicates that the authentication performed by the first device on the second device succeeds, determines to return a message 7 to the second device.

That the first device performs authentication on the hash value 2 of the second device according to the random number 2 of the second device and the first mapping key includes reconstructing, by the first device, a hash value 4 of the second device according to the random number 2 of the second device and the first mapping key, comparing the hash value 4 of the second device with the hash value 2 that is of the second device and is in the message 4, and if the hash value 4 of the second device is the same as the hash value 2 that is of the second device and is in the message 4, determining to return the message 7 to the second device.

70. The first device sends the message 7 to the second device, where the message 7 includes the random number 2 that is of the first device and is obtained after encryption by using the encryption key, so that the second device performs authentication on the hash value 2 of the first device according to the random number 2 of the first device and the second mapping key, where if the hash value 2 of the first device is correct, it indicates that the authentication performed by the second device on the first device succeeds.

It may be understood that, before the step of sending, by a first device, a message 1 to a second device, the method further includes generating and storing, by the first device, a mapping key list, so that the first device selects the first mapping key from the mapping key list according to a predetermined rule.

It may further be understood that, the first part of the first mapping key may be the first half, or the first one-third, or the like of the first mapping key, and a rest part of the first mapping key is the second part of the first mapping key. A size of the first part and the second part of the first mapping key is not limited herein.

It may further be understood that, the first key information in the message 1 may be a public key of the first device, or a random number generated by the first device, or another set value; the second key information included in the message 2 may be a public key of the second device, or a random number generated by the second device, or another set value.

In another embodiment of the present invention, the first device and the second device may be transposed, so that the second device performs a step of the first device, and the first device performs a step of the second device.

It may be understood that, a key in this embodiment of the present invention may also be a password, for example, a PIN code of a device.

In this embodiment of the present invention, a method for generating the foregoing first mapping key may be as follows.

The first device may generate, according to the predetermined algorithm, a random value by using the initial key and the random number that are of the first device, and may further perform modulo operation on the random value to obtain the first mapping key, where a quantity of digits of the first mapping key may be the same as or different from a quantity of digits of the initial key of the first device.

The random number may be an encryption key obtained by separately executing the key exchange algorithm by the first device and the second device, or may be a parameter that is sent by the second device and is received by the first device, or a parameter that is obtained by executing the exchange algorithm by the first device and is sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

For example, an initial key of the first device is 4321, and the random number (which is assumed to be a DH key) is 1234, a random value obtained by multiplication is 4321*1234=5332114; a random value may be obtained by addition: 4321+1234=5555; a random value may be obtained by addition after splitting according to a specific rule (for example, use a half of the initial key and a half of the random number): (43+12)+(21+34)=110; or a random value may be obtained by multiplication after splitting according to a specific rule (for example, use a half of the initial key and a half of the random number): (43*12)+(21*34)=924. In this embodiment, calculation performed by multiplying the initial key of the first device by the random number of the first device is used as an example.

Further, the first mapping key may be obtained by performing modulo operation on the random value, that is, the random value is 4321*1234=5332114, a modulus is (10^4−1=9999), and the first mapping key is 5332114 mod (9999)= 2647.

Optionally, the method for generating the first mapping key may also be as follows.

The first device may also generate, according to the predetermined algorithm, a first random value by using the initial key of the first device and a first random number of the first device, and generate, according to the predetermined algorithm, a second random value by using the initial key of the first device and a second random number of the first device.

The first device may separately perform modulo operation on the first random value and the second random value to obtain a first value and a second value, where the first value and the second value constitute the first mapping key, and a quantity of digits of either of the first value and the second value may be a half of the quantity of digits of the initial key of the first device, for example, if the quantity of digits of the initial key of the first device is N, the quantity of digits of either of the first value and the second value is N/2.

The first random number and the second random number may be encryption keys obtained by executing the key exchange algorithm by the first device and the second device, or may be parameters that are sent by the second device and are received by the first device, or parameters that are obtained by executing the exchange algorithm by the first device and are sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

It may be understood that, the first predetermined algorithm is not limited to an algorithm listed in this embodiment, and an appropriate algorithm may be selected by matching the difficulty of authentication between the first device and the second device, which all fall into the protection scope of the embodiments of the present invention.

It may further be understood that, before step 10, the first device may pre-generate and store the mapping key list, where the mapping key list includes at least one first mapping key, and the first device may select the first mapping key from the mapping key list according to a predetermined rule.

The predetermined rule may be shared to the second device by using the first device, and the predetermined rule may be the foregoing first predetermined algorithm, or may be another function algorithm, which is not limited in this embodiment of the present invention.

A method for generating the second mapping key may be as follows. The second device may generate, according to the predetermined algorithm, a random value by using the initial key and the random number that are of the second device, and may further perform modulo operation on the random value to obtain the second mapping key, where a quantity of digits of the second mapping key may be the same as or different from a quantity of digits of the initial key of the second device.

The random number may be an encryption key obtained by separately executing the key exchange algorithm by the first device and the second device, or may be a parameter that is obtained by executing the exchange algorithm by the first device and is sent to the second device, or a parameter that is obtained by executing the exchange algorithm by the second device and is sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

Optionally, the method for generating the second mapping key may also be as follows.

The second device may also generate, according to the predetermined algorithm, a first random value of the second device by using the initial key of the second device and a first random number of the second device, and generate, according to the predetermined algorithm, a second random value of the second device by using the initial key of the second device and a second random number of the second device.

The second device may separately perform modulo operation on the first random value and the second random value that are of the second device to obtain a first value and a second value that are of the second device, where the first value and the second value that are of the second device constitute the second mapping key, and a quantity of digits of either of the first value and the second value that are of the second device may be a half of the quantity of digits of the initial key of the second device.

The first random number and the second random number that are of the second device may be encryption keys obtained by executing the key exchange algorithm by the first device and the second device, or may be parameters that are obtained by executing the exchange algorithm by the first device and are sent to the second device, or parameters that are obtained by executing the exchange algorithm by the second device and are sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

It may be understood that, the first mapping key may also be generated by the second device, and the second mapping key may also be generated by the first device, which is not limited in this embodiment of the present invention.

It may further be understood that, the foregoing process of mutual authentication between the first device and the second device is merely an exemplary embodiment of the present invention, and an execution sequence of steps in the foregoing authentication process is not limited, or the steps may be executed synchronously, as long as mutual authentication between devices is performed by using the authentication method in this embodiment of the present invention. All the steps in the authentication process can be applied to this embodiment of the present invention.

According to the security authentication method in this embodiment of the present invention, a first device performs security authentication on a second device by using a mapped initial key, which can increase the difficulty for an attacker to acquire a key, thereby improving security of a wireless network connection.

Figure 3:
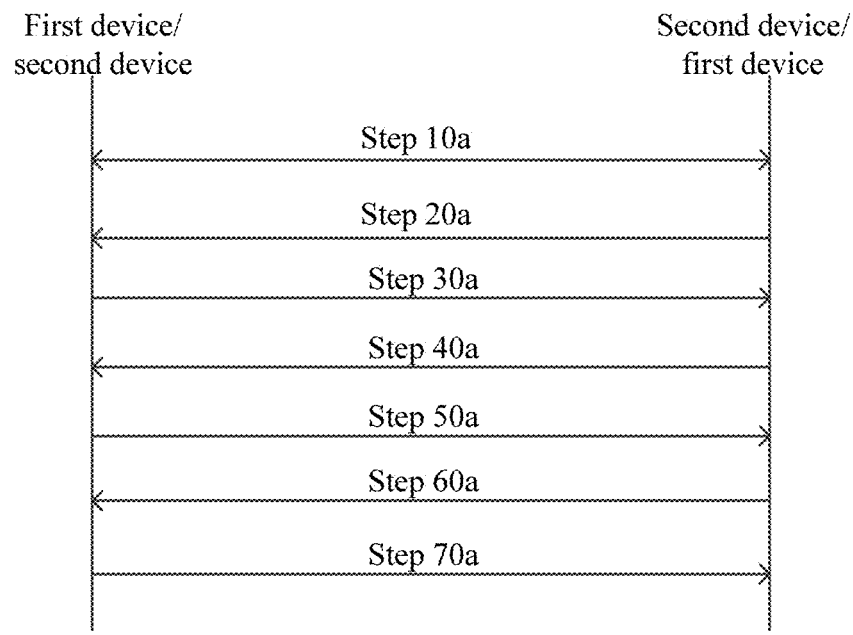
FIG. 3 is a schematic diagram of a security authentication system according to a second embodiment of the present invention.

FIG. 3 is a schematic diagram of a security authentication system according to a second embodiment of the present invention.

This system is applied to a first device and a second device, and is configured to perform security authentication between the first device and the second device.

10a. The first device sends a message 1 to the second device, where the message 1 includes first key information, so that the second device executes, after receiving the message 1, a dynamic key exchange algorithm according to the first key information, to generate at least one encryption key.

20a. The first device receives a message 2 returned by the second device to the first device, where the message 2 includes second key information, and the first device executes a dynamic key exchange algorithm according to the second key information, to generate at least one encryption key.

The dynamic key exchange algorithm in step 10a and step 20a is at least one of a DH algorithm, an RSA algorithm, and an ElGamal algorithm, where DH is an acronym of a Diffie-Hellman algorithm, RSA is an acronym of Ron Rivest, Adi Shamirh, and Len Adleman, and the ElGamal algorithm is an ElGamal key exchange algorithm. An encryption key, such as a DH key, KDK, AuthKey, KeyWrapKey, and EMSK, may be obtained by calculation by using a DH key exchange algorithm.

It may be understood that, each time security authentication is performed between the first device and the second device, the first key information and the second key information may change, and may be shared by the first device and the second device.

30a. The first device sends a message 3 to the second device, where the message 3 includes a hash value 1 of the first device and a hash value 2 of the first device, where the hash value 1 of the first device is generated according to a random number 1 of the first device and a first part of a first mapping key, and the hash value 2 of the first device is generated according to a random number 2 of the first device and a second part of the first mapping key, so that the second device determines, after receiving the message 3, to return a message 4 to the first device, where the first mapping key is generated according to an initial key of the first device and a first predetermined algorithm.

40a. The first device receives the message 4 sent by the second device, where the message 4 includes a hash value 1 of the second device, a hash value 2 of the second device, and an encrypted random number 1 of the second device, where the hash value 1 of the second device is generated according to the random number 1 of the second device and a first part of a second mapping key, the hash value 2 of the second device is generated according to a random number 2 of the second device and a second part of the second mapping key, the encrypted random number 1 of the second device is obtained by encrypting a random number 1 of the second device by using the encryption key, and the second mapping key is generated according to an initial key of the second device and the first predetermined algorithm, so that the first device performs authentication on the hash value 1 of the second device according to the random number 1 of the second device and the first mapping key, and if the hash value 1 of the second device is correct, determines to return a message 5 to the second device.

That the first device performs authentication on the hash value 1 of the second device according to the random number 1 of the second device and the first mapping key includes reconstructing, by the first device, a hash value 3 of the second device according to the random number 1 of the second device and the first mapping key, comparing the hash value 3 of the second device with the hash value 1 that is of the second device and is in the message 4, and if the hash value 3 of the second device is the same as the hash value 1 that is of the second device and is in the message 4, determining to return the message 5 to the second device.

50a. The first device sends the message 5 to the second device, where the message 5 includes the random number 1 that is of the first device and is obtained after encryption by using the encryption key, so that the second device performs authentication on the hash value 1 of the first device according to the random number 1 of the first device and the second mapping key, and if the hash value 1 of the first device is correct, determines to return a message 6 to the first device.

60a. The first device receives the message 6, where the message 6 includes the random number 2 that is of the second device and is obtained after encryption by using the encryption key, so that the first device performs authentication on the hash value 2 of the second device according to the random number 2 of the second device and the first mapping key, and if the hash value 2 of the second device is correct, which indicates that the authentication performed by the first device on the second device succeeds, determines to return a message 7 to the second device.

That the first device performs authentication on the hash value 2 of the second device according to the random number 2 of the second device and the first mapping key includes reconstructing, by the first device, a hash value 4 of the second device according to the random number 2 of the second device and the first mapping key, comparing the hash value 4 of the second device with the hash value 2 that is of the second device and is in the message 4, and if the hash value 4 of the second device is the same as the hash value 2 that is of the second device and is in the message 4, determining to return the message 7 to the second device.

70a. The first device sends the message 7 to the second device, where the message 7 includes the random number 2 that is of the first device and is obtained after encryption by using the encryption key, so that the second device performs authentication on the hash value 2 of the first device according to the random number 2 of the first device and the second mapping key, where if the hash value 2 of the first device is correct, it indicates that the authentication performed by the second device on the first device succeeds.

It may be understood that, before the step of sending, by the first device, a message 1 to the second device, generating and storing, by the first device, a mapping key list, so that the first device selects the first mapping key from the mapping key list according to a predetermined rule.

It may further be understood that, the first part of the first mapping key may be the first half, or the first one-third, or the like of the first mapping key, and a rest part of the first mapping key is the second part of the first mapping key. A size of the first part and the second part of the first mapping key is not limited herein.

It may further be understood that, the first key information in the message 1 may be a public key of the first device, or a random number generated by the first device, or another set value; the second key information included in the message 2 may be a public key of the second device, or a random number generated by the second device, or another set value.

In another embodiment of the present invention, the first device and the second device may be transposed, so that the second device performs a step of the first device, and the first device performs a step of the second device.

It may be understood that, a key in this embodiment of the present invention may also be a password, for example, a PIN code of a device.

In this embodiment of the present invention, a method for generating the foregoing first mapping key may be as follows.

The first device may generate, according to the predetermined algorithm, a random value by using the initial key and the random number that are of the first device, and may further perform modulo operation on the random value to obtain the first mapping key, where a quantity of digits of the first mapping key may be the same as or different from a quantity of digits of the initial key of the first device.

The random number may be an encryption key obtained by separately executing the key exchange algorithm by the first device and the second device, or may be a parameter that is sent by the second device and is received by the first device, or a parameter that is obtained by executing the exchange algorithm by the first device and is sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

For example, an initial key of the first device is 4321, and the random number (which is assumed to be a DHkey) is 1234, a random value obtained by multiplication is 4321*1234=5332114; a random value may be obtained by addition: 4321+1234=5555; a random value may be obtained by addition after splitting according to a specific rule (for example, use a half of the initial key and a half of the random number): (43+12)+(21+34)=110; or a random value may be obtained by multiplication after splitting according to a specific rule (for example, use a half of the initial key and a half of the random number): (43*12)+(21*34)=924. In this embodiment, multiplying the initial key of the first device by the random number of the first device is used as an example to perform calculation.

Further, the first mapping key may be obtained by performing modulo operation on the random value, that is, the random value is 4321*1234=5332114, a modulus is (10^4−1=9999), and the first mapping key is 5332114 mod (9999)= 2647.

Optionally, the method for generating the first mapping key may also be as follows.

The first device may also generate, according to the predetermined algorithm, a first random value by using the initial key of the first device and a first random number of the first device, and generate, according to the predetermined algorithm, a second random value by using the initial key of the first device and a second random number of the first device.

The first device may separately perform modulo operation on the first random value and the second random value to obtain a first value and a second value, where the first value and the second value constitute the first mapping key, and a quantity of digits of either of the first value and the second value may be a half of the quantity of digits of the initial key of the first device, for example, if the quantity of digits of the initial key of the first device is N, the quantity of digits of either of the first value and the second value is N/2.

The first random number and the second random number may be encryption keys obtained by executing the key exchange algorithm by the first device and the second device, or may be parameters that are sent by the second device and are received by the first device, or parameters that are obtained by executing the exchange algorithm by the first device and are sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

It may be understood that, the first predetermined algorithm is not limited to an algorithm listed in this embodiment, and an appropriate algorithm may be selected by matching the difficulty of authentication between the first device and the second device, which all fall into the protection scope of the embodiments of the present invention.

It may further be understood that, before step 10a, the first device may pre-generate and store the mapping key list, where the mapping key list includes at least one first mapping key, and the first device may select the first mapping key from the mapping key list according to a predetermined rule.

The predetermined rule may be shared to the second device by using the first device, and the predetermined rule may be the foregoing first predetermined algorithm, or may be another function algorithm, which is not limited in this embodiment of the present invention.

A method for generating the second mapping key may be as follows. The second device may generate, according to the predetermined algorithm, a random value by using the initial key and the random number that are of the second device, and may further perform modulo operation on the random value to obtain the second mapping key, where a quantity of digits of the second mapping key may be the same as or different from a quantity of digits of the initial key of the second device.

The random number may be an encryption key obtained by separately executing the key exchange algorithm by the first device and the second device, or may be a parameter that is obtained by executing the exchange algorithm by the first device and is sent to the second device, or a parameter that is obtained by executing the exchange algorithm by the second device and is sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

Optionally, the method for generating the second mapping key may also be as follows.

The second device may also generate, according to the predetermined algorithm, a first random value of the second device by using the initial key of the second device and a first random number of the second device, and generate, according to the predetermined algorithm, a second random value of the second device by using the initial key of the second device and a second random number of the second device.

The second device may separately perform modulo operation on the first random value and the second random value that are of the second device to obtain a first value and a second value that are of the second device, where the first value and the second value that are of the second device constitute the second mapping key, and a quantity of digits of either of the first value and the second value that are of the second device may be a half of the quantity of digits of the initial key of the second device.

The first random number and the second random number that are of the second device may be encryption keys obtained by executing the key exchange algorithm by the first device and the second device, or may be parameters that are obtained by executing the exchange algorithm by the first device and are sent to the second device, or parameters that are obtained by executing the exchange algorithm by the second device and are sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

It may be understood that, the first mapping key may also be generated by the second device, and the second mapping key may also be generated by the first device, which is not limited in this embodiment of the present invention.

It may further be understood that, the foregoing process of mutual authentication between the first device and the second device is merely an exemplary embodiment of the present invention, and an execution sequence of steps in the foregoing authentication process is not limited, or the steps may be executed synchronously, as long as mutual authentication between devices is performed by using an authentication method in this embodiment of the present invention. All the steps in the authentication process can be applied to this embodiment of the present invention.

According to the security authentication system in this embodiment of the present invention, a first device performs security authentication on a second device by using a mapped initial key, which can increase the difficulty for an attacker to acquire a key, thereby improving security of a wireless network connection.

Figure 4:
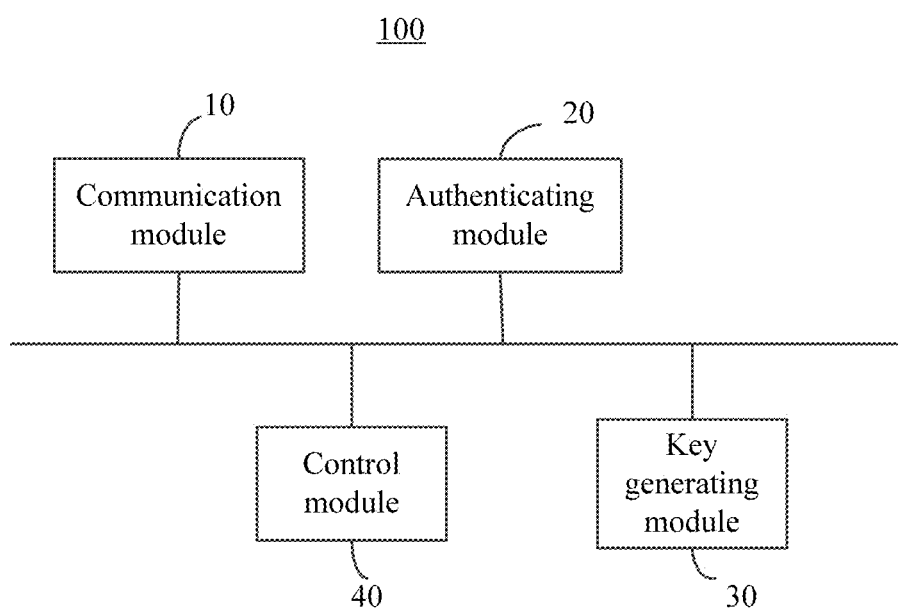
FIG. 4 is a schematic diagram of a first device for security authentication according to a third embodiment of the present invention.

FIG. 4 is a schematic diagram of a first device 100 for security authentication according to a third embodiment of the present invention.

The first device 100 is configured to perform security authentication on a second device, and the first device 100 includes a communication module 10, an authenticating module 20, a key generating module 30, and a control module 40.

The communication module 10 sends a message 1 to the second device, where the message 1 includes first key information, so that the second device executes, after receiving the message 1, a dynamic key exchange algorithm according to the first key information, to generate at least one encryption key.

The communication module 10 receives a message 2 returned by the second device to the first device 100, where the message 2 includes second key information, and the key generating module 30 executes a dynamic key exchange algorithm according to the second key information, to generate at least one encryption key.

The communication module 10 sends a message 3 to the second device, where the message 3 includes a hash value 1 of the first device and a hash value 2 of the first device, where the hash value 1 of the first device is generated according to a random number 1 of the first device and a first part of a first mapping key, and the hash value 2 of the first device is generated according to a random number 2 of the first device and a second part of the first mapping key, so that the second device determines, after receiving the message 3, to return a message 4 to the first device 100, where the first mapping key is generated by the key generating module 30 according to an initial key of the first device 100 and a first predetermined algorithm.

The communication module 10 receives the message 4 sent by the second device, where the message 4 includes a hash value 1 of the second device, a hash value 2 of the second device, and an encrypted random number 1 of the second device, where the hash value 1 of the second device is generated according to the random number 1 of the second device and a first part of a second mapping key, the hash value 2 of the second device is generated according to a random number 2 of the second device and a second part of the second mapping key, the encrypted random number 1 of the second device is obtained by encrypting a random number 1 of the second device by using the encryption key, and the second mapping key is generated according to an initial key of the second device and the first predetermined algorithm, so that the authenticating module 20 performs authentication on the hash value 1 of the second device according to the random number 1 of the second device and the first mapping key, where if the hash value 1 of the second device is correct, the control module 40 determines to return a message 5 to the second device.

The communication module 10 sends the message 5 to the second device, where the message 5 includes the random number 1 that is of the first device and is obtained after encryption by using the encryption key, so that the second device performs authentication on the hash value 1 of the first device according to the random number 1 of the first device and the second mapping key, and if the hash value 1 of the first device is correct, determines to return a message 6 to the first device 100.

The communication module 10 receives the message 6, where the message 6 includes the random number 2 that is of the second device and is obtained after encryption by using the encryption key, so that the authenticating module 20 performs authentication on the hash value 2 of the second device according to the random number 2 of the second device and the first mapping key, where if the hash value 2 of the second device is correct, which indicates that the authentication performed by the first device 100 on the second device succeeds, the control module 40 determines to return a message 7 to the second device.

The communication module 10 sends the message 7 to the second device, where the message 7 includes the random number 2 that is of the first device and is obtained after encryption by using the encryption key, so that the second device performs authentication on the hash value 2 of the first device according to the random number 2 of the first device and the second mapping key, where if the hash value 2 of the first device is correct, it indicates that the authentication performed by the second device on the first device 100 succeeds.

The dynamic key exchange algorithm is at least one of a DH algorithm, an RSA algorithm, and an ElGamal algorithm, where DH is an acronym of a Diffie-Hellman algorithm, RSA is an acronym of Ron Rivest, Adi Shamirh, and Len Adleman, and the ElGamal algorithm is an ElGamal key exchange algorithm. An encryption key, such as a DH key, KDK, AuthKey, KeyWrapKey, and EMSK, may be obtained by calculation by using a DH key exchange algorithm.

It may be understood that, each time security authentication is performed between the first device and the second device, the first key information and the second key information may change, and may be shared by the first device and the second device.

That the authenticating module 20 performs authentication on the hash value 1 of the second device according to the random number 1 of the second device and the first mapping key includes reconstructing, by the authenticating module 20, a hash value 3 of the second device according to the random number 1 of the second device and the first mapping key, comparing the hash value 3 of the second device with the hash value 1 that is of the second device and is in the message 4, where if the hash value 3 of the second device is the same as the hash value 1 that is of the second device and is in the message 4, the control module 40 determines to return the message 5 to the second device; that the authenticating module 20 performs authentication on the hash value 2 of the second device according to the random number 2 of the second device and the first mapping key includes reconstructing, by the authenticating module 20, a hash value 4 of the second device according to the random number 2 of the second device and the first mapping key, comparing the hash value 4 of the second device with the hash value 2 that is of the second device and is in the message 4, where if the hash value 4 of the second device is the same as the hash value 2 that is of the second device and is in the message 4, the control module 40 determines to return the message 7 to the second device.

It may be understood that, before the communication module 10 sends the message 1 to the second device, the key generating module 30 generates and stores a mapping key list, so that the first device selects the first mapping key from the mapping key list according to a predetermined rule.

It may further be understood that, the first part of the first mapping key may be the first half, or the first one-third, or the like of the first mapping key, and a rest part of the first mapping key is the second part of the first mapping key. A size of the first part and the second part of the first mapping key is not limited herein.

It may further be understood that, the first key information in the message 1 may be a public key of the first device, or a random number generated by the first device, or another set value; the second key information included in the message 2 may be a public key of the second device, or a random number generated by the second device, or another set value.

In another embodiment of the present invention, the first device 100 and the second device may be transposed, so that the second device has the communication module, the authenticating module, the key generating module, and the control module, and has a function of the first device 100.

It may be understood that, a key in this embodiment of the present invention may also be a password, for example, a PIN code of a device.

In this embodiment of the present invention, a method for generating the foregoing first mapping key may be as follows.

The key generating module 30 may generate, according to the predetermined algorithm, a random value by using the initial key and the random number that are of the first device 100, and may further perform modulo operation on the random value to obtain the first mapping key, where a quantity of digits of the first mapping key may be the same as or different from a quantity of digits of the initial key of the first device.

The random number may be an encryption key obtained by separately executing the key exchange algorithm by the first device and the second device, or may be a parameter that is sent by the second device and is received by the first device, or a parameter that is obtained by executing the exchange algorithm by the first device and is sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

For example, an initial key of the first device is 4321, and the random number (which is assumed to be a DHkey) is 1234, a random value obtained by multiplication is 4321*1234=5332114; a random value may be obtained by addition: 4321+1234=5555; a random value may be obtained by addition after splitting according to a specific rule (for example, use a half of the initial key and a half of the random number): (43+12)+(21+34)=110; or a random value may be obtained by multiplication after splitting according to a specific rule (for example, use a half of the initial key and a half of the random number): (43*12)+(21*34)=924. In this embodiment, multiplying the initial key of the first device by the random number of the first device is used as an example to perform calculation.

Further, the first mapping key may be obtained by performing modulo operation on the random value, that is, the random value is 4321*1234=5332114, a modulus is (10^4−1=9999), and the first mapping key is 5332114 mod (9999)=2647.

Optionally, the method for generating the first mapping key may also be as follows.

The key generating module 30 may also generate, according to the predetermined algorithm, a first random value by using the initial key of the first device and a first random number of the first device, and generate, according to the predetermined algorithm, a second random value by using the initial key of the first device and a second random number of the first device.

The key generating module 30 may separately perform modulo operation on the first random value and the second random value to obtain a first value and a second value, where the first value and the second value constitute the first mapping key, and a quantity of digits of either of the first value and the second value may be a half of the quantity of digits of the initial key of the first device, for example, if the quantity of digits of the initial key of the first device is N, the quantity of digits of either of the first value and the second value is N/2.

The first random number and the second random number may be encryption keys obtained by executing the key exchange algorithm by the first device and the second device, or may be parameters that are sent by the second device and are received by the first device, or parameters that are obtained by executing the exchange algorithm by the first device and are sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

It may be understood that, the first predetermined algorithm is not limited to an algorithm listed in this embodiment, and an appropriate algorithm may be selected by matching the difficulty of authentication between the first device and the second device, which all fall into the protection scope of the embodiments of the present invention.

A method for generating the second mapping key may be as follows. The second device may generate, according to the predetermined algorithm, a random value by using the initial key and the random number that are of the second device, and may further perform modulo operation on the random value to obtain the second mapping key, where a quantity of digits of the second mapping key may be the same as or different from a quantity of digits of the initial key of the second device.

The random number may be an encryption key obtained by separately executing the key exchange algorithm by the first device and the second device, or may be a parameter that is obtained by executing the exchange algorithm by the first device and is sent to the second device, or a parameter that is obtained by executing the exchange algorithm by the second device and is sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

Optionally, the method for generating the second mapping key may also be as follows.

The second device may also generate, according to the predetermined algorithm, a first random value of the second device by using the initial key of the second device and a first random number of the second device, and generate, according to the predetermined algorithm, a second random value of the second device by using the initial key of the second device and a second random number of the second device.

The second device may separately perform modulo operation on the first random value and the second random value that are of the second device to obtain a first value and a second value that are of the second device, where the first value and the second value that are of the second device constitute the second mapping key, and a quantity of digits of either of the first value and the second value that are of the second device may be a half of the quantity of digits of the initial key of the second device.

The first random number and the second random number that are of the second device may be encryption keys obtained by executing the key exchange algorithm by the first device and the second device, or may be parameters that are obtained by executing the exchange algorithm by the first device and are sent to the second device, or parameters that are obtained by executing the exchange algorithm by the second device and are sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

It may be understood that, the first mapping key may also be generated by the second device, and the second mapping key may also be generated by the first device, which is not limited in this embodiment of the present invention.

The first device for security authentication in this embodiment of the present invention performs security authentication on a second device by using a mapped initial key, which can increase the difficulty for an attacker to acquire a key, thereby improving security of a wireless network connection.

Figure 5:
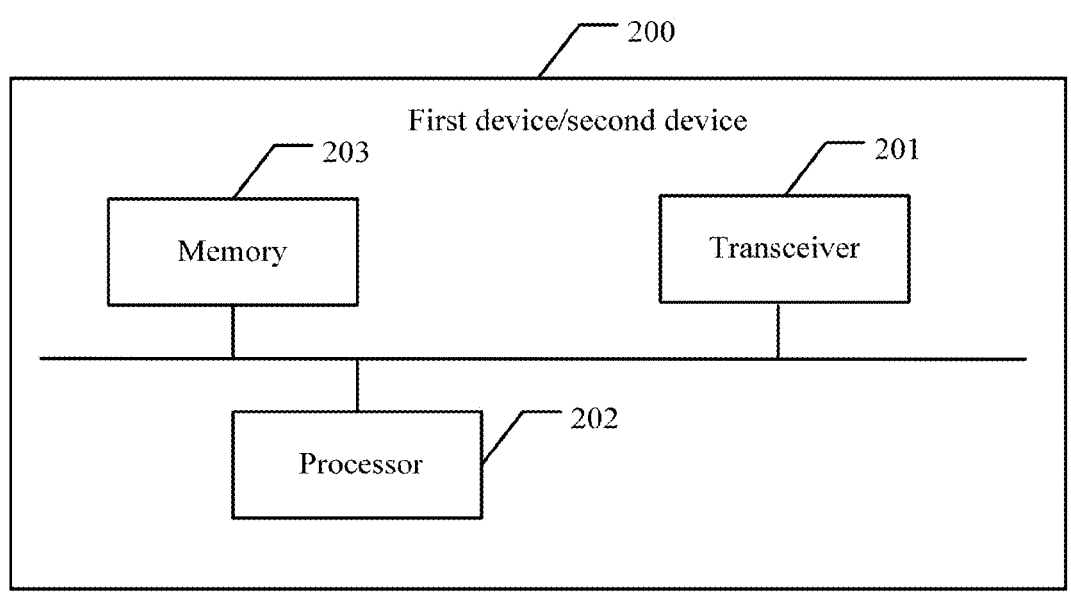
FIG. 5 is a schematic diagram of a first device for security authentication according to a fourth embodiment of the present invention.

FIG. 5 is a schematic diagram of a first device 200 for security authentication according to a fourth embodiment of the present invention.

The first device 200 is configured to perform security authentication on a second device, and the first device 200 includes a transceiver 201 and a processor 202, where the transceiver 201 sends a message 1 to the second device, where the message 1 includes first key information, so that the second device executes, after receiving the message 1, a dynamic key exchange algorithm according to the first key information, to generate at least one encryption key.

The transceiver 201 receives a message 2 returned by the second device to the first device 200, where the message 2 includes second key information, and the processor 202 executes a dynamic key exchange algorithm according to the second key information, to generate at least one encryption key.

The transceiver 201 sends a message 3 to the second device, where the message 3 includes a hash value 1 of the first device and a hash value 2 of the first device, where the hash value 1 of the first device is generated according to a random number 1 of the first device and a first part of a first mapping key, and the hash value 2 of the first device is generated according to a random number 2 of the first device and a second part of the first mapping key, so that the second device determines, after receiving the message 3, to return a message 4 to the first device 200, where the first mapping key is generated by the processor 202 according to an initial key of the first device 200 and a first predetermined algorithm.

The transceiver 201 receives the message 4 sent by the second device, where the message 4 includes a hash value 1 of the second device, a hash value 2 of the second device, and an encrypted random number 1 of the second device, where the hash value 1 of the second device is generated according to the random number 1 of the second device and a first part of a second mapping key, the hash value 2 of the second device is generated according to a random number 2 of the second device and a second part of the second mapping key, the encrypted random number 1 of the second device is obtained by encrypting a random number 1 of the second device by using the encryption key, and the second mapping key is generated according to an initial key of the second device and the first predetermined algorithm, so that the processor 202 performs authentication on the hash value 1 of the second device according to the random number 1 of the second device and the first mapping key, and if the hash value 1 of the second device is correct, determines to return a message 5 to the second device.

The transceiver 201 sends the message 5 to the second device, where the message 5 includes the random number 1 that is of the first device and is obtained after encryption by using the encryption key, so that the second device performs authentication on the hash value 1 of the first device according to the random number 1 of the first device and the second mapping key, and if the hash value 1 of the first device is correct, determines to return a message 6 to the first device 200.

The transceiver 201 receives the message 6, where the message 6 includes the random number 2 that is of the second device and is obtained after encryption by using the encryption key, so that the processor 202 performs authentication on the hash value 2 of the second device according to the random number 2 of the second device and the first mapping key, and if the hash value 2 of the second device is correct, which indicates that the authentication performed by the first device 200 on the second device succeeds, the processor 202 determines to return a message 7 to the second device.

The transceiver 201 sends the message 7 to the second device, where the message 7 includes the random number 2 that is of the first device and is obtained after encryption by using the encryption key, so that the second device performs authentication on the hash value 2 of the first device according to the random number 2 of the first device and the second mapping key, where if the hash value 2 of the first device is correct, it indicates that the authentication performed by the second device on the first device 200 succeeds.

The dynamic key exchange algorithm is at least one of a DH algorithm, an RSA algorithm, and an ElGamal algorithm, where DH is an acronym of a Diffie-Hellman algorithm, RSA is an acronym of Ron Rivest, Adi Shamirh, and Len Adleman, and the ElGamal algorithm is an ElGamal key exchange algorithm. An encryption key, such as a DH key, KDK, AuthKey, KeyWrapKey, and EMSK, may be obtained by calculation by using a DH key exchange algorithm.

It may be understood that, each time security authentication is performed between the first device and the second device, the first key information and the second key information may change, and may be shared by the first device and the second device.

That the processor 202 performs authentication on the hash value 1 of the second device according to the random number 1 of the second device and the first mapping key includes reconstructing, by the processor 202, a hash value 3 of the second device according to the random number 1 of the second device and the first mapping key, comparing the hash value 3 of the second device with the hash value 1 that is of the second device and is in the message 4, and if the hash value 3 of the second device is the same as the hash value 1 that is of the second device and is in the message 4, determining to return the message 5 to the second device.

That the processor 202 performs authentication on the hash value 2 of the second device according to the random number 2 of the second device and the first mapping key includes reconstructing, by the processor 202, a hash value 4 of the second device according to the random number 2 of the second device and the first mapping key, comparing the hash value 4 of the second device with the hash value 2 that is of the second device and is in the message 4, and if the hash value 4 of the second device is the same as the hash value 2 that is of the second device and is in the message 4, determining to return the message 7 to the second device.

It may be understood that the first device 200 further includes a memory 203, before the transceiver 201 sends the message 1 to the second device, the processor 202 generates a mapping key list and stores the mapping key list into the memory 203, so that the first device selects the first mapping key from the mapping key list according to a predetermined rule.

It may further be understood that, the first part of the first mapping key may be the first half, or the first one-third, or the like of the first mapping key, and a rest part of the first mapping key is the second part of the first mapping key. A size of the first part and the second part of the first mapping key is not limited herein.

It may further be understood that, the first key information in the message 1 may be a public key of the first device, or a random number generated by the first device, or another set value; the second key information included in the message 2 may be a public key of the second device, or a random number generated by the second device, or another set value.

In another embodiment of the present invention, the first device 200 and the second device may be transposed, so that the second device has the transceiver 201, the processor 202, and the memory 203, and has a function of the first device 200.

It may be understood that, a key in this embodiment of the present invention may also be a password, for example, a PIN code of a device.

In this embodiment of the present invention, a method for generating the foregoing first mapping key may be as follows.

The processor 202 may generate, according to the predetermined algorithm, a random value by using the initial key and the random number that are of the first device, and may further perform modulo operation on the random value to obtain the first mapping key, where a quantity of digits of the first mapping key may be the same as or different from a quantity of digits of the initial key of the first device.

The random number may be an encryption key obtained by separately executing the key exchange algorithm by the first device and the second device, or may be a parameter that is sent by the second device and is received by the first device, or a parameter that is obtained by executing the exchange algorithm by the first device and is sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

For example, an initial key of the first device is 4321, and the random number (which is assumed to be a DHkey) is 1234, a random value obtained by multiplication is 4321*1234=5332114; a random value may be obtained by addition: 4321+1234=5555; a random value may be obtained by addition after splitting according to a specific rule (for example, use a half of the initial key and a half of the random number): (43+12)+(21+34)=110; or a random value may be obtained by multiplication after splitting according to a specific rule (for example, use a half of the initial key and a half of the random number): (43*12)+(21*34)=924. In this embodiment, multiplying the initial password of the first device by the random number of the first device is used as an example to perform calculation.

Further, the first mapping key may be obtained by performing modulo operation on the random value, that is, the random value is 4321*1234=5332114, a modulus is (10^4−1=9999), and the first mapping key is 5332114 mod (9999)=2647.

Optionally, the method for generating the first mapping key may also be as follows.

The processor 202 may also generate, according to the predetermined algorithm, a first random value by using the initial key of the first device and a first random number of the first device, and generate, according to the predetermined algorithm, a second random value by using the initial key of the first device and a second random number of the first device.

The processor 202 may separately perform modulo operation on the first random value and the second random value to obtain a first value and a second value, where the first value and the second value constitute the first mapping key, and a quantity of digits of either of the first value and the second value may be a half of the quantity of digits of the initial key of the first device.

The first random number and the second random number may be encryption keys obtained by executing the key exchange algorithm by the first device and the second device, or may be parameters that are sent by the second device and are received by the first device, or parameters that are obtained by executing the exchange algorithm by the first device and are sent to the second device. The predetermined algorithm may be an algorithm, for example, adding the initial key and the random number that are of the first device together, multiplying the initial key of the first device by the random number of the first device, or adding the initial key and the random number that are of the first device together after the initial key and the random number are split according to a specific rule, or multiplying the initial key of the first device by the random number of the first device after the initial key and the random number are split according to a specific rule.

It may be understood that, the first predetermined algorithm is not limited to an algorithm listed in this embodiment, and an appropriate algorithm may be selected by matching the difficulty of authentication between the first device and the second device, which all fall into the protection scope of the embodiments of the present invention.

A method for generating the second mapping key may be as follows. The second device may generate, according to the predetermined algorithm, a random value by using the initial key and the random number that are of the second device, and may further perform modulo operation on the random value to obtain the second mapping key, where a quantity of digits of the second mapping key may be the same as or different from a quantity of digits of the initial key of the second device.

The random number may be an encryption key obtained by separately executing the key exchange algorithm by the first device and the second device, or may be a parameter that is obtained by executing the exchange algorithm by the first device and is sent to the second device, or a parameter that is obtained by executing the exchange algorithm by the second device and is sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

Optionally, the method for generating the second mapping key may also be as follows.

The second device may also generate, according to the predetermined algorithm, a first random value of the second device by using the initial key of the second device and a first random number of the second device, and generate, according to the predetermined algorithm, a second random value of the second device by using the initial key of the second device and a second random number of the second device.

The second device may separately perform modulo operation on the first random value and the second random value that are of the second device to obtain a first value and a second value that are of the second device, where the first value and the second value that are of the second device constitute the second mapping key, and a quantity of digits of either of the first value and the second value that are of the second device may be a half of the quantity of digits of the initial key of the second device.

The first random number and the second random number that are of the second device may be encryption keys obtained by executing the key exchange algorithm by the first device and the second device, or may be parameters that are obtained by executing the exchange algorithm by the first device and are sent to the second device, or parameters that are obtained by executing the exchange algorithm by the second device and are sent to the first device. The predetermined algorithm may be an algorithm, for example, adding the initial key and the random number that are of the second device together, multiplying the initial key of the second device by the random number of the second device, or adding the initial key and the random number that are of the second device together after the initial key and the random number are split according to a specific rule, or multiplying the initial key of the second device by the random number of the second device after the initial key and the random number are split according to a specific rule.

It may be understood that, the first mapping key may also be generated by the second device, and the second mapping key may also be generated by the first device, which is not limited in this embodiment of the present invention.

The first device for security authentication in this embodiment of the present invention performs security authentication on a second device by using a mapped initial key, which can increase the difficulty for an attacker to acquire a key, thereby improving security of a wireless network connection.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a random-access memory (RAM), a magnetic disk, or an optical disc.

The foregoing provides detailed descriptions on the security authentication method, device, and system provided by embodiments of the present invention. In this specification, specific examples are used to describe the principle and implementation manners of the present invention, and the description of the embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A security authentication method, comprising:
    sending, by a first device, a first message to a second device, wherein the first message comprises first key information such that the second device executes, after receiving the first message, a dynamic key exchange algorithm according to the first key information to generate at least one encryption key;
    receiving, by the first device, a second message returned by the second device to the first device, wherein the second message comprises second key information;
    executing, by the first device, a dynamic key exchange algorithm according to the second key information to generate at least one encryption key;
    sending, by the first device, a third message to the second device, wherein the third message comprises a first hash value of the first device and a second hash value of the first device, wherein the first hash value of the first device is generated according to a first random number of the first device and a first part of a first mapping key, wherein the second hash value of the first device is generated according to a second random number of the first device and a second part of the first mapping key such that the second device determines, after receiving the third message, to return a fourth message to the first device, and wherein the first mapping key is generated by performing a modulo operation on a random value generated by a first predetermined algorithm processing an initial key of the first device and the first random number of the first device;
    receiving, by the first device, the fourth message sent by the second device, wherein the fourth message comprises a first hash value of the second device, a second hash value of the second device, and a first encrypted random number of the second device, wherein the first hash value of the second device is generated according to the first random number of the second device and a first part of a second mapping key, wherein the second hash value of the second device is generated according to a second random number of the second device and a second part of the second mapping key, wherein the first encrypted random number of the second device is obtained by encrypting a first random number of the second device by using the encryption key, wherein the second mapping key is generated according to an initial key of the second device and the first predetermined algorithm such that the first device performs authentication on the first hash value of the second device according to the first random number of the second device and the first mapping key, and wherein when the first hash value of the second device is correct, the first device determines to return a fifth message to the second device;
    sending, by the first device, the fifth message to the second device, wherein the fifth message comprises the first random number that is of the first device and is obtained after encryption by using the encryption key such that the second device performs authentication on the first hash value of the first device according to the first random number of the first device and the second mapping key, and wherein when the first hash value of the first device is correct, the second device determines to return a sixth message to the first device;
    receiving, by the first device, the sixth message, wherein the sixth message comprises the second random number that is of the second device and is obtained after encryption by using the encryption key such that the first device performs authentication on the second hash value of the second device according to the second random number of the second device and the first mapping key, and wherein when the second hash value of the second device is correct, which indicates that the authentication performed by the first device on the second device succeeds, the first device determines to return a seventh message to the second device; and
    sending, by the first device, the seventh message to the second device, wherein the seventh message comprises the second random number that is of the first device and is obtained after encryption by using the encryption key such that the second device performs authentication on the second hash value of the first device according to the second random number of the first device and the second mapping key, and wherein when the second hash value of the first device is correct, it indicates that the authentication performed by the second device on the first device succeeds.

2. The method according to claim 1, wherein the dynamic key exchange algorithm is at least one of a Diffie-Hellman (DH) algorithm, a Ron Rivest, Adi Shamirh, and Len Adleman (RSA) algorithm, and an ElGamal algorithm.

3. The method according to claim 1, Wherein that the first device performs authentication on the first hash value of the second device according to the first random number of the second device and the first mapping key comprises:
    reconstructing, by the first device, a third hash value of the second device according to the first random number of the second device and the first mapping key;
    comparing the third hash value of the second device with the first hash value that is of the second device and is in the fourth message; and
    determining to return, by the first device, the fifth message to the second device when the third hash value of the second device is the same as the first hash value that is of the second device and is in the fourth message.

4. The method according to claim 1, wherein that the first device performs authentication on the second hash value of the second device according to the second random number of the second device and the first mapping key comprises:
    reconstructing, by the first device, a fourth hash value of the second device according to the second random number of the second device and the first mapping key;

comparing the fourth hash value of the second device with the second hash value that is of the second device and is in the fourth message; and determining to return, by the first device, the seventh message to the second device when the fourth hash value of the second device is the same as the second hash value that is of the second device and is in the fourth message.

5. The method according to claim 1, wherein before sending, by the first device, the first message to the second device, the method further comprises generating and storing, by the first device, a mapping key list such that the first device selects the first mapping key from the mapping key list according to a predetermined rule.

6. The method according to claim 1, wherein the first device and the second device are transposed such that the second device performs a step of the first device, and the first device performs a step of the second device.

7. The method according to claim 1, wherein the first key information is a public key of the first device, or a random number generated by the first device, and wherein the second key information is a public key of the second device, or a random number generated by the second device.

8. A security authentication system, comprising:
a first device; and
a second device,
wherein the first device sends a first message to the second device,
wherein the first message comprises first key information such that the second device executes, after receiving the first message, a dynamic key exchange algorithm according to the first key information to generate at least one encryption key,
wherein the first device receives a second message returned by the second device to the first device, wherein the second message comprises second key information, wherein the first device executes a dynamic key exchange algorithm according to the second key information to generate at least one encryption key,
wherein the first device sends a third message to the second device, wherein the third message comprises a first hash value of the first device and a second hash value of the first device, wherein the first hash value of the first device is generated according to a first random number of the first device and a first part of a first mapping key, wherein the second hash value of the first device is generated according to a second random number of the first device and a second part of the first mapping key such that the second device determines, after receiving the third message, to return a fourth message to the first device, wherein the first mapping key is generated by performing a modulo operation on a random value generated by a first predetermined algorithm processing an initial key of the first device and the first random number of the first device,
wherein the first device receives the fourth message sent by the second device, wherein the fourth message comprises a first hash value of the second device, a second hash value of the second device, and a first encrypted random number of the second device, wherein the first hash value of the second device is generated according to the first random number of the second device and a first part of a second mapping key, wherein the second hash value of the second device is generated according to a second random number of the second device and a second part of the second mapping key, wherein the first encrypted random number of the second device is obtained by encrypting a first random number of the second device by using the encryption key, wherein the second mapping key is generated according to an initial key of the second device and the first predetermined algorithm such that the first device performs authentication on the first hash value of the second device according to the first random number of the second device and the first mapping key, wherein when the first hash value of the second device is correct, the first device determines to return a fifth message to the second device, wherein the first device sends the fifth message to the second device, wherein the fifth message comprises the first random number that is of the first device and is obtained after encryption by using the encryption key such that the second device performs authentication on the first hash value of the first device according to the first random number of the first device and the second mapping key, herein when the first hash value of the first device is correct, the second device determines to return a sixth message to the first device;

wherein the first device receives the sixth message, wherein the sixth message comprises the second random number that is of the second device and is obtained after encryption by using the encryption key such that the first device performs authentication on the second hash value of the second device according to the second random number of the second device and the first mapping key, wherein when the second hash value of the second device is correct, which indicates that the authentication performed by the first device on the second device succeeds, the first device determines to return a seventh message to the second device, wherein the first device sends the seventh message to the second device, wherein the seventh message comprises the second random number that is of the first device and is obtained after encryption by using the encryption key such that the second device performs authentication on the second hash value of the first device according to the second random number of the first device and the second mapping key, and wherein when the second hash value of the first device is correct, it indicates that the authentication performed by the second device on the first device succeeds.

9. The system according to claim 8, wherein the dynamic key exchange algorithm is at least one of a Diffie-Hellman (DH) algorithm, a Ron Rivest, Adi Shamirh, Len Adleman (RSA) algorithm, and an ElGamal algorithm.

10. The system according to claim 8, wherein that the first device performs authentication on the first hash value of the second device according to the first random number of the second device and the first mapping key comprises:
reconstructing, by the first device, a third hash value of the second device according to the first random number of the second device and the first mapping key;
comparing the third hash value of the second device with the first hash value that is of the second device and is in the fourth message; and
determining to return the fifth message to the second device when the third hash value of the second device is the same as the first hash value that is of the second device and is in the fourth message.

11. The system according to claim 8, wherein that the first device performs authentication on the second hash value of the second device according to the second random number of the second device and the first mapping key comprises:

reconstructing, by the first device, a fourth hash value of the second device according to the second random number of the second device and the first mapping key;

comparing the fourth hash value of the second device with the second hash value that is of the second device and is in the fourth message; and determining to return the seventh message to the second device when the fourth hash value of the second device is the same as the second hash value that is of the second device and is in the fourth message.

12. The system according to claim 8, wherein before sending, by the first device, the first message to the second device, the first device generates and stores a mapping key list such that the first device selects the first mapping key from the mapping key list according to a predetermined rule.

13. The system according to claim 8, wherein the first device and the second device are transposed such that the second device performs a step of the first device and the first device performs a step of the second device.

14. The system according to claim 8, wherein the first key information is a public key of the first device, or a random number generated by the first device, and wherein the second key information is a public key of the second device, or a random number generated by the second device.

15. A first device for security authentication configured to perform security authentication on a second device, wherein the first device comprises:

a transmitter; and a processor, wherein the transmitter sends a first message to the second device, wherein the first message comprises first key information such that the second device executes, after receiving the first message, a dynamic key exchange algorithm according to the first key information to generate at least one encryption key, wherein the transmitter receives a second message returned by the second device to the first device, wherein the second message comprises second key information, wherein the processor executes a dynamic key exchange algorithm according to the second key information to generate at least one encryption key, wherein the transmitter sends a third message to the second device, wherein the third message comprises a first hash value of the first device and a second hash value of the first device, wherein the first hash value of the first device is generated according to a first random number of the first device and a first part of a first mapping key, wherein the second hash value of the first device is generated according to a second random umber of the first device and a second part of the first mapping key such that the second device determines, after receiving the third message, to return a fourth message to the first device, wherein the first mapping key is generated by the processor performing a modulo operation on a random value generated by a first predetermined algorithm processing an initial key of the first device and the first random number of the first device, wherein the transmitter receives the fourth message sent by the second device, wherein the fourth message comprises a first hash value of the second device, a second hash value of the second device, and a first encrypted random number of the second device, wherein the first hash value of the second device is generated according to the first random number of the second device and a first part of a second mapping key, wherein the second hash value of the second device is generated according to a second random number of the second device and a second part of the second mapping key, wherein the first encrypted random number of the second device is obtained by encrypting a first random number of the second device by using the encryption key, wherein the second mapping key is generated according to an initial key of the second device and the first predetermined algorithm such that the processor performs authentication on the first hash value of the second device according to the first random number of the second device and the first mapping key, wherein when the first hash value of the second device is correct, the processor determines to return a fifth message to the second device, wherein the transmitter sends the fifth message to the second device, wherein the fifth message comprises the first random number that is of the first device and is obtained after encryption by using the encryption key such that the second device performs authentication on the first hash value of the first device according to the first random number of the first device and the second mapping key, wherein the transmitter receives a sixth message, wherein the sixth message comprises the second random number that is of the second device and is obtained after encryption by using the encryption key such that the processor performs authentication on the second hash value of the second device according to the second random number of the second device and the first mapping key, wherein when the second hash value of the second device is correct, which indicates that the authentication performed by the first device on the second device succeeds, the processor determines to return a seventh message to the second device, wherein the transmitter sends the seventh message to the second device, wherein the seventh message comprises the second random number that is of the first device and is obtained after encryption by using the encryption key such that the second device performs authentication on the second hash value of the first device according to the second random number of the first device and the second mapping key and wherein when the second hash value of the first device is correct, it indicates that the authentication performed by the second device on the first device succeeds.

16. The first device according to claim 15, wherein the dynamic key exchange algorithm is at least one of a Diffie-Hellman (DH) algorithm, a Ron Rivest, Adi Shamirh, Len Adleman (RSA) algorithm, and an ElGamal algorithm.

17. The first device according to claim 15, wherein that the processor performs authentication on the first hash value of the second device according to the first random number of the second device and the first mapping key comprises:

reconstructing, by the processor, a third hash value of the second device according to the first random number of the second device and the first mapping key; and comparing the third hash value of the second device with the first hash value that is of the second device and is in the fourth message, wherein when the third hash value of the second device is the same as the first hash value that is of the second device and is in the fourth message, the processor determines to return the fifth message to the second device.

18. The first device according to claim 15, wherein that the processor performs authentication on the second hash value of the second device according to the second random number of the second device and the first mapping key comprises:

reconstructing, by the processor, a fourth hash value of the second device according to the second random number of the second device and the first mapping key; and comparing the fourth hash value of the second device with the second hash value that is of the second device and is in the fourth message, wherein when the fourth hash value of the second device is the same as the second hash value that is of the second device and is in the fourth message, the processor determines to return the seventh message to the second device.

19. The first device according to claim 15, wherein before the processor sends the first message to the second device, the processor generates and stores the mapping key list such that the first device selects the first mapping key from the mapping key list according to a predetermined rule.

20. The first device according to claim 15, wherein the first device and the second device are transposed such that the second device has the processor, and has a function of the first device.

21. The first device according to claim 15, wherein the first key information is a public key of the first device, or a random number generated by the first device, and wherein the second key information is a public key of the second device, or a random number generated by the second device.

\* \* \* \* \*